(12) United States Patent
Sonnette et al.

(10) Patent No.: US 11,807,377 B2
(45) Date of Patent: Nov. 7, 2023

(54) AIRCRAFT PROPULSION SYSTEM

(71) Applicant: SAFRAN ELECTRICAL & POWER, Blagnac (FR)

(72) Inventors: Pierre-Julien Sonnette, Moissy-Cramayel (FR); Alexis Renotte, Moissy-Cramayel (FR); Benoit Linck, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 302 days.

(21) Appl. No.: 17/427,210

(22) PCT Filed: Jan. 30, 2020

(86) PCT No.: PCT/FR2020/000022
§ 371 (c)(1),
(2) Date: Jul. 30, 2021

(87) PCT Pub. No.: WO2020/157403
PCT Pub. Date: Aug. 6, 2020

(65) Prior Publication Data
US 2022/0144444 A1      May 12, 2022

(30) Foreign Application Priority Data

Feb. 1, 2019   (FR) ...................................... 1901009

(51) Int. Cl.
*B64D 31/10*   (2006.01)
*H02K 11/20*   (2016.01)
(Continued)

(52) U.S. Cl.
CPC .............. *B64D 31/10* (2013.01); *B64C 11/30* (2013.01); *B64C 29/00* (2013.01); *B64D 27/24* (2013.01);
(Continued)

(58) Field of Classification Search
CPC ........ B64D 31/10; B64D 27/24; B64D 31/12; B64D 2027/026; B64C 11/30;
(Continued)

(56) References Cited

U.S. PATENT DOCUMENTS 10,023,318  B2    7/2018  Kobayashi et al.
2010/0100262 A1*  4/2010  Blanvillain .......... G05D 1/0072
                                                   701/14
(Continued)

FOREIGN PATENT DOCUMENTS

EP    1 783 890 A1    5/2007
FR    2 790 428 A1    9/2000
(Continued)

OTHER PUBLICATIONS

International Search Report dated May 15, 2020, issued in corresponding International Application No. PCT/FR2020/000022, filed Jan. 30, 2020, 7 pages.
(Continued)

*Primary Examiner* — Rodney A Bonnette
(74) *Attorney, Agent, or Firm* — CHRISTENSEN O'CONNOR JOHNSON KINDNESS PLLC

(57) ABSTRACT

An aircraft propulsion system includes a turbomachine and at least one electric motor. The motor includes a first half-motor and a second half-motor that include, respectively, a first stator and a second stator cooperating with a common rotor of the motor.
The propulsion system further includes at least one first energy source (B) capable of delivering a DC voltage and at least one electric generator (PMG) driven by the turbomachine. The electric generator generates an AC voltage to form a second energy source and is associated with an active rectifier that transforms the AC voltage into a DC voltage. The value of the DC voltage (Continued)

is controlled by the active rectifier, the output of which is connected to the first energy source.

10 Claims, 2 Drawing Sheets

(51) Int. Cl.
| | | |
|---|---|---|
| *B64C 11/30* | (2006.01) | |
| *B64C 29/00* | (2006.01) | |
| *B64D 27/24* | (2006.01) | |
| *B64D 31/12* | (2006.01) | |
| *F02K 5/00* | (2006.01) | |
| *H02K 11/04* | (2016.01) | |
| *H02K 16/04* | (2006.01) | |
| *B64D 27/02* | (2006.01) | |

(52) U.S. Cl.
CPC ............... *B64D 31/12* (2013.01); *F02K 5/00* (2013.01); *H02K 11/04* (2013.01); *H02K 11/20* (2016.01); *H02K 16/04* (2013.01); *B64D 2027/026* (2013.01)

(58) Field of Classification Search
CPC ........ B64C 29/00; H02K 11/20; H02K 11/04; H02K 16/04; F02K 5/00
See application file for complete search history.

(56) References Cited

U.S. PATENT DOCUMENTS

| | | | |
|---|---|---|---|
| 2018/0354632 A1 | 12/2018 | Hon et al. | |
| 2019/0322365 A1* | 10/2019 | Gaffney | ................ B64C 39/024 |
| 2020/0115062 A1* | 4/2020 | Klonowski | ............ B64D 27/24 |
| 2020/0228041 A1* | 7/2020 | Beniakar | .................. H02K 3/28 |
| 2020/0366176 A1* | 11/2020 | Houshmand | ........... H02K 21/14 |
| 2022/0185489 A1* | 6/2022 | Thiriet | ................... B64D 27/04 |

FOREIGN PATENT DOCUMENTS

| | | | |
|---|---|---|---|
| FR | 2 839 215 A1 | 10/2003 | |
| FR | 2 937 008 A1 | 4/2010 | |
| FR | 3 056 555 A1 | 3/2018 | |

OTHER PUBLICATIONS

Written Opinion dated May 15, 2020 Issued in corresponding International Application No. PCT/FR20207000022, filed Jan. 30, 2020, 9 pages.

English translation of Written Opinion dated May 15, 2020, issued in corresponding International Application No. PCT/FR2020/000022, filed Jan. 30, 2020, 8 pages.

International Preliminary Report on Patentability dated Jul. 27, 2021 issued in corresponding International Application No. PCT/FR2020/000022, filed Jan. 30, 2020, 10 pages.

* cited by examiner

AIRCRAFT PROPULSION SYSTEM

FIELD OF THE DISCLOSURE

The disclosure relates to an aircraft propulsion system. The disclosure relates more particularly to the architecture of an electrical chain of a hybrid propulsion system for an aircraft.

BACKGROUND

Vertical Take-Off and Landing (VTOL) aircraft are increasingly used, especially in the intra-urban and inter-urban transport of goods or people.

More and more of these aircraft are operating with hybrid propulsion systems, for example a system comprising a turbomachine, an electric generator driven by the turbomachine, and a battery. In fact, purely electric systems operating only from a battery are only viable for transporting a load over a short distance, such as those in the intra-urban market, since the range of the batteries, linked to the low power density of the batteries compared to a turbogenerator, is not sufficient for other markets.

It is known how to use an aircraft propulsion device comprising several electric motors each composed of a first half-motor and a second half-motor, comprising respectively a first stator and a second stator cooperating with a common rotor of the motor, at least one battery configured to deliver a direct voltage, and at least one electric generator configured to generate an alternating voltage and associated with an active rectifier configured to transform the alternating voltage into a direct voltage, the value of which is piloted by the active rectifier, the battery being connected to the output of the active rectifier.

The battery is usually connected directly to the motor power supply bus. However, the battery voltage varies according to its charge level, which affects its operating mode in discharge or recharge and the power supply to the motor(s) concerned.

Furthermore, since each motor is divided into two half-motors, it is necessary to be able to control both half-motors efficiently and simply at the same speed.

Finally, in the event of the loss or failure of one of the half-motors, it is necessary to be able to detect such a failure and isolate the affected half-motor in order to be able to continue to control the other half-motor effectively.

SUMMARY

The disclosure is intended to address some or all of these technical issues. To this end, the disclosure proposes an aircraft propulsion system comprising:
- a turbomachine,
- at least one electric motor comprising a first half-motor and a second half-motor, comprising respectively a first stator and a second stator cooperating with a common rotor of the motor,
- at least one first energy source configured to deliver a DC voltage,
- at least one electric generator driven by the turbomachine and configured to generate an AC voltage so as to form a second energy source, and associated with an active rectifier configured to transform the AC voltage into a DC voltage, the value of which is controlled by the active rectifier, the first energy source being connected to the output of the active rectifier, characterised in that it comprises:
- at least one command module configured to supply and control the speed of each half-motor, on the basis of the voltage of the first energy source and/or of the voltage at the output of the active rectifier,
- at least one monitoring module distinct from the command module, the monitoring module being configured to remove the power supply from at least one electric half-motor if anomaly is detected.

A half-motor shares a common rotor with its associated half-motor, with each half-motor having a separate stator.

The anomaly may, for example, be the detection of the loss of a propeller blade driven by the motor or a failure or malfunction of the command module.

The fact that a separate monitoring module has been created makes it possible to more reliably detect any type of anomaly, in particular an anomaly in the command module itself. The term "separate" means that the command module and the monitoring module are implemented as two physically separate units so that a possible failure of the command module does not affect the monitoring module, and vice versa.

The motor is thus associated with a hybrid power supply that can use both the first energy source and the electric generator. In operation, the generator voltage is controlled to match the voltage of the first power source via the active generator. In the case of a battery, the voltage is thus adapted so that the battery is in charge, floating or discharge mode.

The use of an active rectifier makes it possible to control the charging rate of the first energy source, and therefore its voltage, according to requirements. In this way, there is no need for an additional converter at the output of the first power source in order to provide a stable voltage regardless of the charging rate of the first power source. This reduces the mass of the assembly.

The first energy source can be a battery, a fuel cell, a supercapacitor or any other energy source configured to store electrical energy for example.

The command module and/or the monitoring module can be located between the active rectifier and the motor.

The propulsion system can comprise at least a first command module able to power at least a first half-motor and control the rotational speed of first half-motor, and at least a second command module able to power at least a second half-motor and control the rotational speed of the second half-motor, and means for synchronizing the first command module and the second command module.

The synchronization means enable the first half-motor and the second half-motor to be controlled so that the rotation speeds of these half-motors are identical.

The propulsion system can comprise at least a first command module called master and a second command module called slave, each command module being able to power at least a first half-motor and a second half-motor and to control the speed of rotation of the first and second half-motors, and switching means able to activate only the first command module in a normal operating mode and able to activate only the second command module in a degraded operating mode.

The command module and the monitoring module can comprise electronic components of different technologies.

For example, it is possible to use processors of different types on the command module and on the monitoring module, one of the modules having, for example, one or more DSP (Digital Signal Processor) processors, the other having, for example, one or more MPC (MicroProgrammable Controller) processors. It is also possible to use an FPGA (Field Programmable Gate Arrays)

integrated circuit for any of these modules, either as a replacement for or in addition to the processors.

In this way, the risk of a simultaneous failure of the control and monitoring modules, e.g., if the permissible temperature of the components concerned is exceeded, is reduced.

The propulsion system can comprise at least one actuator for changing the pitch of the blades of a propeller rotatably coupled to the rotor of the electric motor.

The propulsion system can include switching means configured to connect or disconnect the first power source and/or the active rectifier from the motor power supply chain.

The propulsion system can comprise at least two motors, a first half-motor of a first motor and a second half-motor of a second motor being powered and controlled by a single command module.

The active rectifier and/or the switching means can be controlled by the command module. The disclosure also relates to a vertical take-off and landing aircraft comprising at least one propulsion system of the above type, a propeller being rotatably coupled to the rotor of each motor.

DETAILED DESCRIPTION

Figure 1:
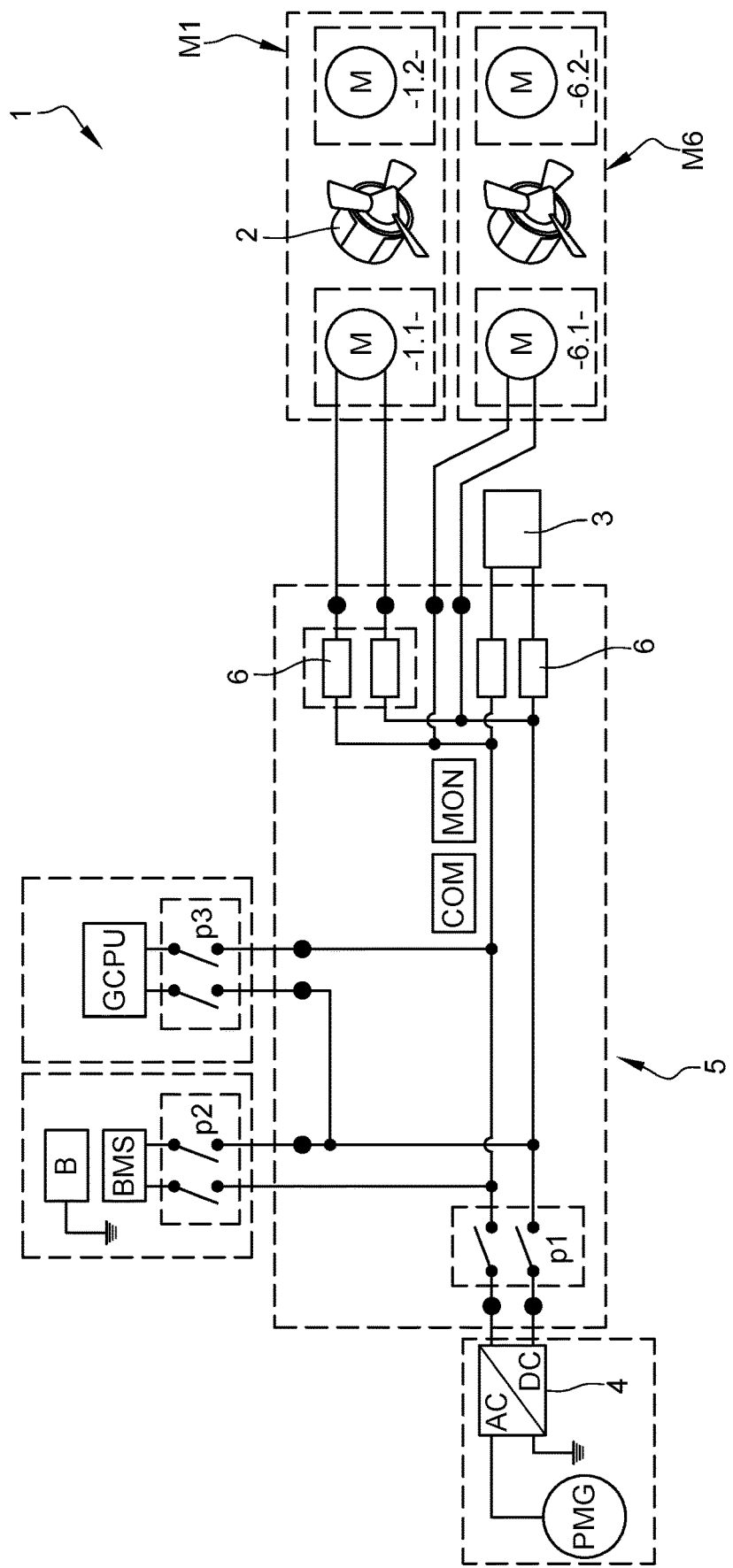
FIG. 1 is a diagram illustrating the architecture of an electrical supply line for two electric motors of a propulsion system according to the disclosure.

FIG. 1 shows part of an assembly 1 for a propulsion system of a vertical take-off and landing aircraft, according to one embodiment of the disclosure. More specifically, this figure illustrates the architecture of a power supply chain or line intended to power two motors M1 and M6 from a hybrid power supply.

Each motor M1, M6 comprises two half-motors M1.1, M1.2 and M6.1, M6.2, each comprising a stator cooperating with a rotor common to both motor halves M1.1, M1.2, M6.1, M6.2. The use of two half-motors provides electrical redundancy and means that the electrical power of each half-motor can be reduced, thus reducing the size and mass of the half-motors. In addition, such redundancy improves the operational safety of the propulsion system in the event of failure of one of the half-motors. The motor or each half-motor can be equipped with sensors configured to provide information on the torque or speed of the rotor.

The rotor of each motor M1, M6 is coupled to a propeller 2 having blades with a variable pitch that can be adjusted by means of an actuator 3.

The electrical power sources for the motors M1, M6 and the actuator 3 are formed by:
- a permanent magnet generator (PMG), driven in rotation by a turbomachine and associated with an active rectifier (4) configured to transform the AC voltage coming from the PMG into a DC voltage, the value of which is controlled by the active rectifier (4),
- a battery B associated with a BMS (Battery Management System), configured to deliver a DC voltage, and optionally, a GCPU (Ground Cart Power Unit) configured to deliver a DC voltage, which can be connected to the aircraft when the latter is on the ground.

Power supply lines 5 connect the output of the active rectifier 4, the battery B and the associated BMS management system, and possibly the ground starting unit GCPU, firstly, to the motors M1, M6 and the actuator 3, on the other hand, through controlled switches or contactors p1, p2, p3, and protection and insulation means 6 formed, for example, by fuses. The controlled switches p1, p2, p3 are used to switch off one and/or other of the above-mentioned power sources.

The switch referred to as p1 isolates the PMG generator and the active rectifier 4 from the rest of the power supply chain 5.

The switch referred to as p2 is used to isolate the battery B and the battery management system BMS from the rest of the power system 5.

The switch referenced p3 is used to isolate the ground power unit GCPU from the rest of the power train 5.

The propulsion system further comprises a command module able to supply and control the speed of each half-motor M1.1, M1.2, M6.1, M6.2, from the battery voltage B and/or the output voltage of the active rectifier 4.

The command module can also be used to drive the active rectifier 4 in order to adjust the output voltage of the active rectifier 4, and to drive the controlled switches p1, p2, p3.

The regulation of the output voltage of the active rectifier 4 makes it possible to charge or discharge the battery B as required, and to control the charge level of the battery B.

The command module can, more specifically, be used to manage the output voltage control loops of the active rectifier, and the speed control loops of the half-motors.

The propulsion system also comprises a monitoring module (MON), which is separate from the command module, the monitoring module being configured to remove power from each electric half-motor M1.1, M1.2, M6.1, M6.2 if an anomaly is detected.

The command module and the monitoring module are dissimilar in that they contain electronic components, in particular digital cores, of different technologies.

For example, it is possible to use processors of different types on the command module and the monitoring module, one of the modules having, for example, one or more DSP (Digital Signal Processor) processors, the other having, for example, one or more MPC (MicroProgrammable Controller) processors. It is also possible to use an FPGA-type integrated circuit for one or other of these modules, as a replacement or addition to the processors.

In this way, the risk of a simultaneous failure of the command module and of the monitoring modules, e.g., if the permissible temperature of the components concerned is exceeded, is reduced.

The digital core or processor of the command module for controlling the half-motors can be of a different technology than the digital core or processor of the command module for controlling the active rectifier 4.

Similarly, the digital core or processor of the monitoring module for monitoring the half-motors can be of a different technology than the digital core or processor of the monitoring module for monitoring the active rectifier 4.

By way of example, the control of the half-motors can be performed using a TM5320 DSP-type processor, the monitoring of the half-motors can be performed using an MPC 5566-type processor, the control of the active rectifier 4 can be performed using an MPC 5566-type processor, and the monitoring of the active rectifier 4 can be performed using a TM5320 DSP-type processor.

Only two motors M1, M6 are shown here. Of course, the propulsion system can comprise several pairs of motors, for example three pairs of motors, whereby a power supply chain, a command module and a monitoring module can be associated with each pair of motors M1, M6. The motors of a pair are preferably arranged symmetrically with respect to a centre of symmetry of the aircraft.

The signals exchanged between the different elements of the propulsion system can be:
- the speed setpoints of each M1.1, M1.2, M6.1, M6.2 half-motor between the aircraft flight controls and each command module,
- the current setpoints or cyclic reports sent from the command modules to the M1.1, M1.2, M6.1, M6.2 half-motors,
- the speed and health measurements of the M1.1, M1.2, M6.1, M6.2 consolidated in electronic modules and sent to the flight controls,
- the hybridization setpoints (power ratio between the B battery and the PMG generator), the operational modes, and the data from the B battery from a PMG generator supervisor to the command module,
- the output voltage setpoints of each active rectifier 4 from the command modules,
- the monitoring of the electrical power channel (status of the controlled contactors or switches p1, p2, p3, voltages and currents, health of the different elements) from the command module and the monitoring modules,
- the commands of the switching devices (contactors p1, p2, p3 and fuses 6) from the command module and the monitoring module.

Figure 2:
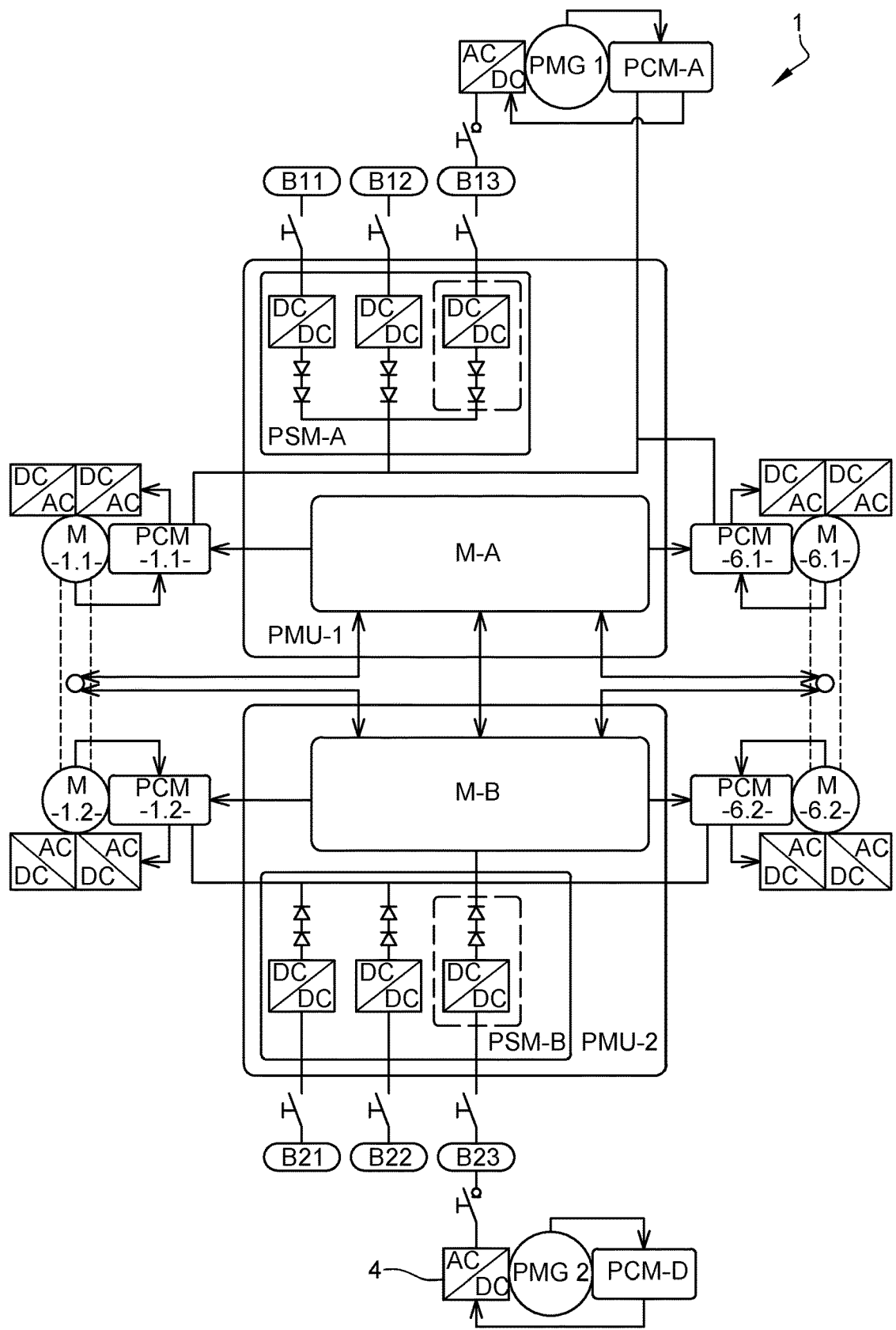
FIG. 2 is a diagram illustrating an embodiment in which the two motors are controlled by two separate and synchronized command modules, each half-motor of a single motor being powered by one of the command modules.

FIG. 2 illustrates a part of an assembly according to an embodiment of the disclosure in which each command module and each monitoring module is doubled so as to achieve redundancy making it possible to guarantee a high level of reliability and security. In this figure, the generator PMG-1, PMG-2 and the half-motors M1.1, M1.2, M6.1, M6.2 are each associated with a unit PMU-1, PMU-2 comprising a command module and a monitoring module within a motherboard M-A, M-B, the propulsion system here also comprising two generators, referenced PMG-1 and PMG-2 respectively.

Each PMU-1 and PMU-2 unit also comprises DC-DC converters grouped within a PSM-A, PSM-B module enabling the voltage level of the B1.1, B1.2, B1.3, B2.1, B2.2, B2.3 buses to which they are connected to be adapted to the supply voltage of the M-A, M-B motherboard. In this configuration, the command module of the PMU-1 controls the M1.1 and M6.1 half-motors belonging to the two motors M1, M6, and synchronizes its setpoints with the command module of the PMU-2. In addition, the command module of the PMU-2 controls the M1.2 and M6.2 half-motors belonging to the two motors M1, M6, and synchronizes its setpoints with the command module of the PMU-1.

The invention claimed is:

1. An aircraft propulsion system comprising:
   a turbomachine,
   at least one electric motor comprising a first half-motor and a second half-motor, comprising, respectively, a first stator and a second stator cooperating with a common rotor of said motor,
   at least one first energy source configured to provide a DC voltage,
   at least one electrical generator driven by the turbomachine and configured to generate an AC voltage to form a second energy source, and associated with an active rectifier configured to transform said AC voltage into a DC voltage the value of which is controlled by said active rectifier, the first power source being connected to the output of the active rectifier,
   at least one command module configured to supply and to control the speed of each half-motor, from at least one of the voltage of the first energy source and the output voltage of the active rectifier,
   at least one monitoring module separate from the command module, the monitoring module being configured to remove the power supply to at least one electric half-motor if an anomaly is detected.

2. The propulsion system according to claim 1, wherein at least one of the command module and the monitoring module is located between the active rectifier and the motor.

3. The propulsion system according to claim 1, wherein the at least one command module includes at least one first command module capable of powering at least one first half-motor and controlling the speed of rotation of said first half-motor, and at least one second command module adapted to supply at least one second half-motor and to control the speed of rotation of said second half-motor, and means for synchronizing the first command module and the second command module.

4. A propulsion system according to claim 1, further comprising at least a first command module known as the master and a second command module known as the slave, each of the first and second command modules being configured to supply at least a first half-motor and a second half-motor and to control a speed of rotation of said first and second half-motors, and switching means configured to activate only the first command module in a normal operating mode and configured to activate only the second command module in a degraded operating mode.

5. A propulsion system according to claim 1, wherein the command module and the monitoring module comprise electronic components of different technologies.

6. A propulsion system according to claim 1, further comprising at least one actuator configured to modify a pitch of the blades of a propeller coupled in rotation to the rotor of the electric motor.

7. A propulsion system according to claim 1, further comprising switching means configured to connect or disconnect the first energy source and/or the active rectifier from the motor supply chain.

8. A propulsion system according to claim 1, further comprising at least two motors, a first half-motor of a first motor and a second half-motor of a second motor being powered and controlled by a single command module.

9. A propulsion system according to claim 1, wherein the active rectifier and/or a switching means are controlled by the command module.

10. A vertical take-off and landing aircraft comprising at least one propulsion system according to claim 1, wherein a propeller is coupled in rotation to the rotor of each motor.

* * * * *